United States Patent Office 2,792,398
Patented May 14, 1957

2,792,398
PIPERAZINE DERIVATIVES

Lucas P. Kyrides, Elkhart, Ind., assignor to Miles Laboratories, Inc., Elkhart, Ind., a corporation of Indiana No Drawing. Application December 3, 1954,
Serial No. 473,037

5 Claims. (Cl. 260—268)

This invention relates to compounds of the formula

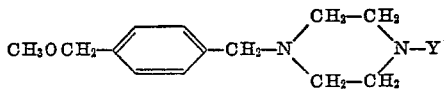

and acid addition salts thereof wherein Y is selected from the group consisting of hydrogen, benzhydryl, and p-chlorobenzhydryl. These N,N'-di-substituted piperazine derivatives have been found to possess antihistaminic activity of particularly long duration.

For a further description of representative specific species of the compounds of this invention and for illustrative techniques in their production reference is made to the following detailed examples:

EXAMPLE I

N-(p-methoxymethyl-benzyl)-piperazine 348 g. (2.1 mols) of the dimethyl ether of p-xylylene glycol, plus 2 g. of zinc chloride catalyst was treated with 110 g. (1.4 mols) of acetyl chloride, dropwise with stirring over 40 minutes at 35–40°. Stirring was continued one hour longer at 30°. This mixture consisting of unchanged dimethyl ether of xylylene glycol and p-methoxymethyl benzyl chloride was added all at one time to 580 g. (3 mols) of piperazine hexahydrate, which had previously been dissolved in 400 cc. of methanol at 30°. The mixture was stirred and external cooling was applied to keep the temperature below 48°. The stirring was continued for 5½ hours at room temperature and the mixture was then allowed to stand overnight. There was then added 56 g. of sodium hydroxide and the mixture extracted with benzene. The benzene solution was fractionated and after removal of benzene, there was obtained the alkylated piperazine, N-(p-methoxymethyl-benzyl)-piperazine, which was collected at 147–149° at 1 mm.

EXAMPLE II

N-(p-methoxymethyl-benzyl)-N'-benzhydryl-piperazine

A mixture of 47 g. (0.214 mol) of N-(p-methoxymethyl-benzyl)-piperazine, prepared according to the method described in Example I above, 53 g. (0.214 mol) of benzhydrylbromide, 22 g. (0.22 mol) of triethylamine and 250 ml. of toluene was placed in an autoclave and heated for 7 hours at 150°. After cooling, the reaction mixture was filtered, stripped of toluene, and residue, upon standing, crystallized. This residue was then recrystallized from Skellysolve-B to give the free base, melting at 81.5–82°.

The chloro-substituted benzhydryl substituent is introduced by the same operating procedure of Example II employing N-(p-methoxymethyl-benzyl)-piperazine and p-chlorobenzhydrylbromide.

EXAMPLE III

N-(p-methoxymethyl-benzyl)-N'-benzhydryl-piperazine dihydrochloride 20 g. of N-(p-methoxymethyl-benzyl)-N'-benzhydryl-piperazine as the free base dissolved in 100 ml. of isopropyl acetate was treated dropwise with a solution consisting of 3.8 g. of anhydrous hydrogen chloride, dissolved in 12 ml. of methanol. During this addition, stirring was used and the temperature maintained below 35°. The fine needles which formed were collected on a filter and these needles then recrystallized from a mixture consisting of 50 ml. of isopropyl acetate and 50 ml. of methanol. 15 g. of fine needles were obtained, melting at 223.5–224.5° which by analysis corresponded to N-(p-methoxymethyl-benzyl) - N' - benzhydryl-piperazine dihydrochloride.

By working in a similar manner with sulfuric and other like acids the various acid addition salts of these compounds can be developed for pharmaceutical applications requiring solid forms of material.

Having described my invention by means of the foregoing representative compounds and their method of preparation, I claim:

1. A composition of matter having the formula

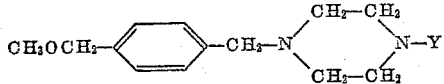

and nontoxic acid addition salts thereof wherein Y is selected from the group consisting of hydrogen, benzhydryl, and p-chlorobenzhydryl.

2. N-(p-methoxymethyl-benzyl)-piperazine.

3. N - (p - methoxymethyl-benzyl) - N' - benzhydryl-piperazine.

4. N - (p - methoxymethyl - benzyl) - N' - (p - chlorobenzhydryl)-piperazine dihydrochloride.

5. N - (p - methoxymethyl - benzyl) - N' - (p - chlorobenzhydryl)-piperazine.

References Cited in the file of this patent
UNITED STATES PATENTS 2,709,169    Morren _____ May 24, 1955